United States Patent [19]

Ramsay et al.

[11] Patent Number: 4,864,605
[45] Date of Patent: Sep. 5, 1989

[54] TELEPHONE TRUNK INTERFACE CIRCUIT

[75] Inventors: John Ramsay, Herndon; Thomas Ouellette, Fairfax, both of Va.

[73] Assignee: International Telesystems Corp., Herndon, Va.

[21] Appl. No.: 165,217

[22] Filed: Mar. 8, 1988

[51] Int. Cl.$^4$ ............................................. H04M 3/42
[52] U.S. Cl. ...................................... 379/379; 379/380; 379/382; 379/377; 379/265
[58] Field of Search ........................ 379/92, 93, 94, 95, 379/96, 97, 98, 99, 100, 102, 250, 257, 380, 379, 382, 399, 269, 377

[56] References Cited

U.S. PATENT DOCUMENTS

| | | | |
|---|---|---|---|
| 4,126,765 | 11/1978 | Calder et al. | 379/380 X |
| 4,203,006 | 5/1980 | Mascia | 379/443 |
| 4,303,804 | 12/1981 | Johnson et al. | 379/92 |
| 4,723,267 | 2/1988 | Jones et al. | 379/93 |

Primary Examiner—James L. Dwyer
Attorney, Agent, or Firm—Whitham and Marhoefer

[57] ABSTRACT

A solid-state telephone trunk interface circuit provides high isolation between a central office and telephone equipment. Opto-isolator transistors and a transformer are used to isolate the central office and the local equipment portions of the circuit. A switching transistor (Q4) is connected between a ring connector (3) and turned on and off via an opto-isolator transistor connected to a control connector (9). A ring detector (11) comprising a first diode bridge is connected between tip and ring connectors (2 and 3) via an opto-isolator transistor to a ring signal connector (13). First and second parallel and opposite sign line condition detectors are respectively connected between tip and ring connectors and via opto-isolator transistors to battery-reverse and battery-forward signal connectors (19 and 17). The voice circuit includes a second diode bridge connecting tip and ring connectors to a first winding of a transformer (T1). The circuit between the diode bridge and the first winding is completed by a high voltage transistor (Q3) which is turned on and off via an opto-isolator transistor connected to an off-hook connector (21). A second winding of the transformer is connected to first and second operational amplifiers respectively connected to voice signal input and output connectors (23 and 25). A feedback cancelling circuit is connected between the voice signal input connector and the input of the second operational amplifier for cancelling a portion of the voice signal input to the voice signal output.

7 Claims, 1 Drawing Sheet

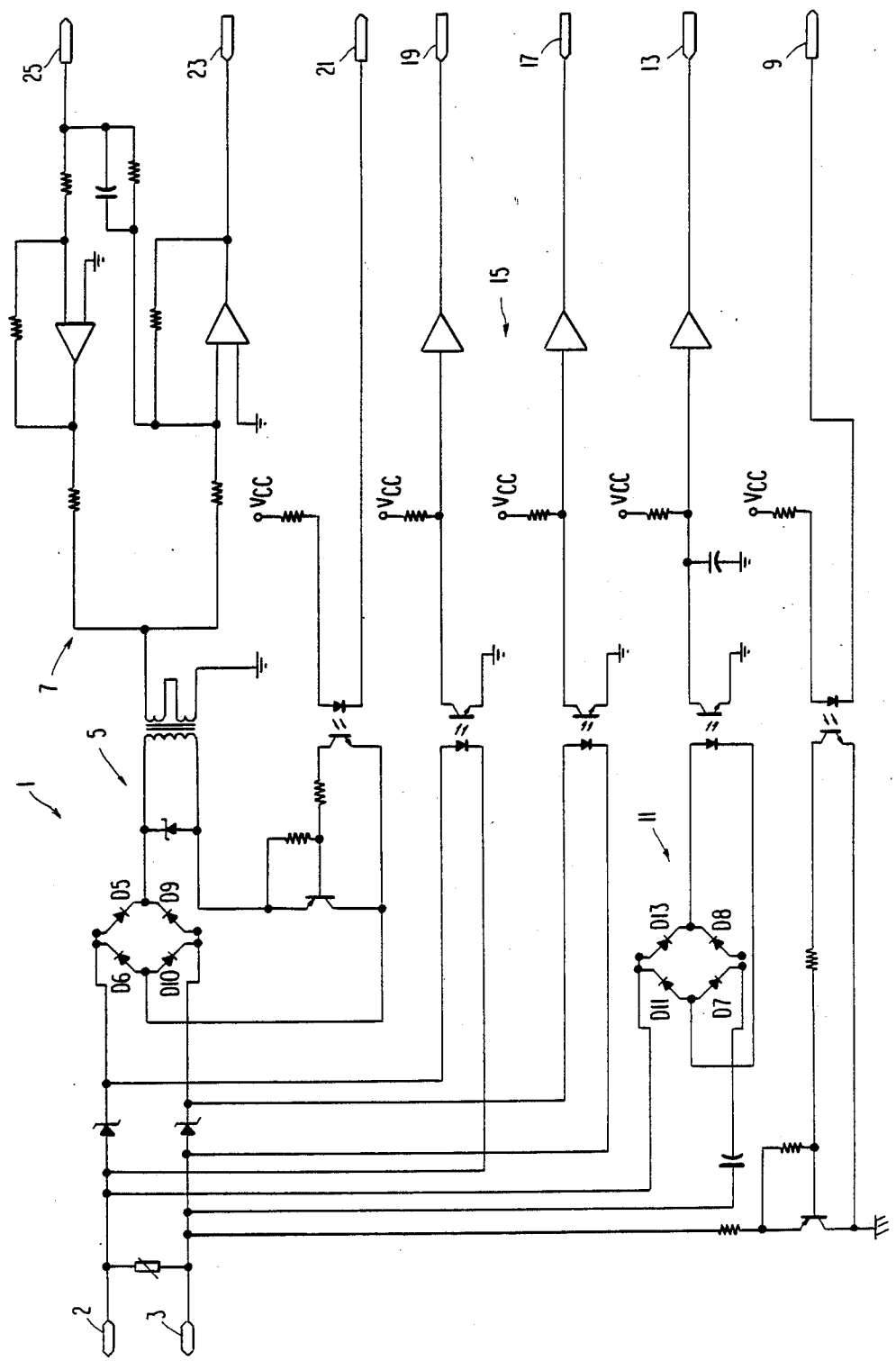

TELEPHONE TRUNK INTERFACE CIRCUIT

BACKGROUND OF THE INVENTION

The present invention relates to systems to connect telephone switching and dialing equipment to telephone company lines or trunks especially as part of call management systems which connect to telephone networks and generate telephone network signalling. This invention is of particular use in, although not limited to, call management systems which originate telephone calls.

Call management systems, also known as call origination systems or telemarketing systems or tele-collections systems, sequentially select telephone numbers, capture a telephone line or trunk, generate DTMF, MF or pulse signals, supply the signals to the line and listen for call progress tones, such as a busy signal or a ring back signal, as well as human voice. Upon an indication that a telephone has been answered, the system transfers the call to a station operator or plays a selected stored message over the telephone line to the called party. The system may also have the capability to play a selected stored message to the called party after connection to a station operator, at the operator's direction, and/or to connect the party to a station operator after playing a selected message.

Systems currently in use utilize switching means such as a Private Branch Exchange (PBX), or dialer circuit boards, physically and logically separate from the processor which controls the system. A need exists to improve the interface to the telephone trunks, including improving speed and quality of telephone network signalling, maintaining electronic isolation of local circuitry from the telephone network so as to prevent interference with telephone communications, and providing these and other features at substantially lesser cost than those currently in use.

SUMMARY OF THE INVENTION

This invention provides an improved means for interconnection of telephone equipment to telephone analog trunks. An analog trunk is a two-wire or four-wire interface which connects the telephone company Central Office to a local piece of equipment. Over this two- or four-wire path, speech and signalling information are carried to and from the Central Office. The speech is balanced over the trunk to reduce both radiation of speech to other trunks, which would result in crosstalk (interference), and noise pickup from other trunks and 60 Hz alternating current (AC) sources.

The invention provides signalling over the trunk by opening and closing the loop. The invention also transmits digits either by rapidly opening and closing the loop (pulses) or by dual-tone multi-frequency (DTMF) signalling.

Systems currently in use accomplish these functions using mechanical relays to isolate the control portions of the system from the telephone line interface. Many systems currently in use also utilize mechanical apparatus, such as relays, to signal on-hook and off-hook conditions to the telephone line. The present invention uses electronic circuits for on-hook and off-hook signalling, providing a less expensive, more physically compact, and more reliable method for performing such signalling. The present invention also utilizes opto-isolator transistors to isolate the control and signalling portions of the system, providing more effective isolation than that provided by systems currently in use, and also providing greater reliability, smaller size, and lower cost.

The present invention provides a loop start analog trunk circuit using improved electronics. The system utilizes a power supply which provides +5 and −5 volt analog supply and a 2.5 volt reference from plural plus and minus volt supplies. Two nearly identical trunk interfaces are connected to each of two pairs of tip and ring trunk connectors. Opto-isolators isolate the local and trunk sides of the ring detector and parallel battery detector circuits. Another opto-isolator turns on a transformer with an off-hook signal. The transformer carries a speech signal to and from operational amplifiers. Outbound speech signals are partially subtracted by a hybrid from the total signals on the transformer, to control the sidetone level. The lower operational amplifier section in the zero interface is supplied with +5 and −5 volt analog inputs.

The trunk circuits described herein can easily be connected in parallel, via a common communications bus such as a Multibus backplane, for use in local telephone equipment such as a call origination system, automatic call distributor, or private branch exchange (PBX).

The above and following specification describes the operation of one preferred loop start analog trunk interface system.

BRIEF DESCRIPTION OF THE DRAWING

The foregoing and other objects, aspects and advantages of the invention will be better understood from the following detailed description of a preferred embodiment of the invention with reference to the drawing in which the sole FIGURE is a schematic circuit diagram showing the telephone trunk interface circuit according to the invention.

DETAILED DESCRIPTION OF A PREFERRED EMBODIMENT OF THE INVENTION

One preferred embodiment of the system 1 is shown in the drawing. This interface 1 isolates the Central Office from the local equipment of a trunk circuit. This isolation prevents interference from the local equipment from entering the telephone network, thus meeting F.C.C. requirements for interfacing to telephone networks.

An analog two-wire interface connects the Central Office (CO) to a local piece of telephone equipment. Over a two-wire path, speech and signalling information are carried both to and from the CO.

The speech is balanced over this pair to reduce both radiation of speech to other pairs, which would result in crosstalk, and noise pickup from other pairs and 60Hz AC sources.

Signalling over the pair is performed by opening and closing the loop. Off-hook is signalled by closing the loop and on-hook is signalled by opening it. Digits may also be sent over the loop by opening and closing it fast enough that the on-hook and off-hook detectors do not see the change of state. This rate is normally 10 pulses per second, and an on/off ratio of 60/40. Digits may also be sent over the loop by dual-tone multi-frequency (DTMF) signalling. Both DTMF and pulse dialing may be used.

The two wires used in the analog trunk are called TIP1 and RING1 in the drawing. Connectors 2 and 3 connect the interface 1 to the tip and ring conductors.

The Central Office has a battery which supplies current through this loop. This current, or lack of it, is used for signalling. The current is modulated to carry speech. The current source is a −48 volt battery connected to ring (riNg for negative). The positive terminal of this same battery is connected to the tip (tiP for positive).

The CO end of a loop start trunk could be the same circuitry which is used to connect to a regular user's telephone.

To resume the discussion of the drawing, it is readily apparent that the design is separated into two distinct halves, 5 and 7. This is a very important feature of this trunk. The left portion, 5, is the Central Office half of the trunk and the right side, 7, is the local telephone equipment half. These two sections are either optically isolated or transformer-isolated. This is necessary so that the local telephone equipment will be sufficiently separated from the CO equipment to allow FCC approval.

The tip and ring wires are connected to the circuit as shown in the top left corner of the drawing. The ring wire is connected via a 100 ohm, 2 watt resistor R21 to a PNP transistor Q4 such as Motorola MPS-A92. The base of transistor Q4 is connected to an opto-isolator ISO2 which turns the transistor Q4 on and off. Turning on the transistor Q4 connects the ring connector 3 to ground, signalling the Central Office that the local equipment is ready to initiate a call. The resistor R21 provides a limitation on current, to prevent overheating the short loop. Resistors RP4A and RP5D provide the biasing voltage. The light-emitting diode in ISO2 is supplied by the circuit which includes the reference voltage VCC, a resistor RP3A and control connector 9.

Ring detector 11 is composed of a 0.47 μf capacitor C38, diode bridge D11, D12, D7, D8, and a Motorola H11D1 opto-isolator ISO5, near the bottom center of the drawing. The ring detector is the circuit which detects ringing voltage on the loop. Ringing voltage is a 20 Hz, 90V rms AC signal superimposed on the −48 volt battery. It is the signal from the CO that it wants to set up a call with the local telephone equipment. In a standard telephone, this signal would ring the bell in the phone, telling the user that a call is coming in.

The ring-detector must be AC-coupled so that no direct current flow around the loop, thus the need for the 0.47 μf DC blocking capacitor C38. When the local telephone equipment detects the ringing voltage it takes the trunk off-hook, closing a DC current path and telling the trunk to turn off the ringing voltage because it is in a state to send and receive voice.

The local telephone equipment side of the ring detector has an integrator built from the 10K pullup resistor R15 and a 1 μf capacitor C33. This 'holds' the ringing signal over during cusps that would otherwise occur due to the sinusoidal ringing voltage being rectified. This allows the local telephone equipment to scan connector 13, which is the ringing signal sense point, at any time during the ringing cycle, and see whether the ringing signal is present or not.

The battery connection or line condition detector 15 is the next circuit connected to the tip 2 and ring 3. This circuit is composed of two high-current TIL 113 optical isolators ISO3, ISO4. The diode in each optical isolator turns on when forward biased only. Thus light turns on the associated transistor, grounding the digital reference VCC on amplifier U17F or U17E. The signals can be sent to the local telephone equipment to convey the state of the trunk in sense points BATFWD1 or BATREV1 at connectors 17 and 19.

The zener diodes D19, D24 connected across opto-isolators ISO3 and ISO4 serve two purposes. First, they prevent the opto-isolators from receiving too great a reverse bias, as they will conduct when the LED part of the opto-isolator is biased off. Second, they prevent an excessive forward bias from being developed across the LED. This could happen during the transition from on-hook to off-hook during ringing, or during a lightning strike.

The transistor sides of the opto-isolators are open collector outputs, which can be sensed. This information can then be sent to the local telephone equipment, such as the Line Control Unit's microprocessor, for further call progress recognition.

Just to the left of the previously mentioned circuitry, in the upper left corner of the drawing, is a metal oxide varistor MOV1. This is a lightning protection device. It normally is an open circuit but becomes a short circuit during a lightning strike to the trunk. It is used right at the front of the trunk circuit, as this is the entrance to more delicate circuitry and the heart of the local telephone equipment switch.

The next circuit on the tip/ring is a diode bridge D5, D6, D9, D10. This is used so that an off-hook condition can be produced independent of the direction of the CO battery. The bridge can always pass the AC voice signals as it is always biased and carrying current due to the CO battery.

The 'output' of the diode bridge goes through a coupling transformer T1 and a high voltage PNP transistor Q3 such as Motorola MPS-A92. The transistor can be turned on and off by an off-hook signal on connector 21, which is via opto-isolator ISO1. When Q3 is on, the trunk circuit is off-hook or, in other words, the loop is closed and CO battery current is being drawn. This allows the AC voice signal to pass through the transformer and be coupled into the switch. When Q3 is turned off, the loop is opened and no current is being drawn. In this state the truck is sitting idle, waiting for an incoming ringing signal or an outgoing off-hook command from the call processor.

The zener diode D14, across the coupling transformer, is additional protection for the speech path.

The coupling transformer T1 is a 600:600 ohm device. This is done so that the speech path will properly match the characteristic impedance of the twisted pair trunk loop. The transformer is an extension of the speech path formed by the trunk loop. It has AC speech signals going from both left to right and right to left. Incoming speech signals from the CO come off the loop and are coupled through the transformer and resistor R11 to the lower operational amplifier U15C in the upper right corner of the drawing. This operational amplifier provides gain before buffering the signal on output VX1, at connector 23.

Analog voice frequency signals arrive through input VR1 connector 25 and are driven through the upper operational amplifier section U15D. This amplifier again provides the necessary gain before buffering the signal to the transformer through the 300 ohm resistor R18. This resistor is necessary for proper impedance matching.

The resistor R8 connecting the upper operational amplifier section to the lower is the hybrid, or two- to four-wire converter. This resistor takes some of the outbound analog signal from VR1 and sums it with the signal present on the transformer. Note that the signal on the transformer is composed of the incoming signal summed with the outgoing signal reversed in phase by 180 degrees, due to the inverting configuration of the upper operational amplifier. Therefore the lower operational amplifier receives the inbound AC signal from the transformer and subtracts some of the outbound signal, thus partially cancelling the outbound signal. This is important since it helps cancel the operator's speech from going back into his/her own ear. This removes the annoyance of the operator's voice returning at a very high level. Some speech is allowed to come back into the operator's ear (sidetone) as it is comforting and removes the dead sound which would otherwise occur.

Digital +5 volt supply VCC 12 is a direct connection to +5 volt input. This VCC voltage is supplied to the appropriate connector of each of the integrated circuit chips, according to each chip's internal logic. In one preferred embodiment, this VCC voltage is supplied via a backplane to a plurality of the trunk circuits described herein.

While the invention has been described with reference to specific embodiments, modifications and variations may be constructed without departing from the scope of the following claims:

We claim:

1. Telephone trunk circuit interface apparatus comprising tip and ring conductor connectors; a ring detector having first and second inputs respectively connected to the tip and ring connectors and having a diode bridge connected between the ring detector inputs; a first opto-isolator having an input portion connected to the diode bridge and having an output portion connected through a pull-up resistor to a voltage source and connected to a grounded capacitor and to an input of a first amplifier, an output of the first amplifier being connected to a ring signal connector, the interface further having first and second parallel and opposite line condition detectors respectively having first connections connected to the tip connector and second connections connected to the ring connector and having diodes as input portions of second and third opto-isolators, output portions of the second and third opto-isolators connected through pull-up resistors to reference voltage sources and connected to inputs of second and third amplifiers, and outputs of second and third amplifiers respectively connected to battery-reverse and battery-forward output signal connectors, the interface having a voice frequency signal diode bridge connected between the tip and ring connectors; a transformer having first and second portions, the voice bridge being connected to the first portion of the transformer, a voice signal control transistor having power terminals, connected in series with the first portion of the transformer and the diode bridge for turning the transformer on and off, the voice transistor having a control terminal; a fifth opto-isolator, the voice transistor control terminal being connected to an output portion of the fifth opto-isolator, the interface having an off-hook signal connector, an input portion of the fifth opto-isolator being connected between a voltage source and the off-hook signal connector, the transformer having a second portion, the interface having first and second operational amplifiers, the first operational amplifier having an input connected to the second portion of the transformer for amplifying the voice signal from the transformer, the interface having voice signal output and voice signal input connectors, the voice signal output connector being connected to an output of the first operational amplifier and the voice signal input connector being connected to an input of the second operational amplifier, and the second operational amplifier having an output connected to the second portion of the transformer for amplifying a voice signal from the voice signal input connector to the transformer.

2. A trunk interface method comprising supplying a ground start signal on a ground start connector to a first optical diode, turning on a first optical isolator with the first optical diode, turning on a transistor with the first optical isolator, and connecting a ring connector to ground with the first transistor, supplying power to a first diode bridge from a ring connector and a tip connector, energizing a second optical diode with the first diode bridge, turning on a second opto-isolator with the second optical diode and supplying the signal to a ring indicator connector with the second opto-isolator, sensing line conditions with third and fourth optical diodes connected respectively in parallel with oppositely connected zener diodes in ring and tip circuits, respectively, and turning on a third opto-isolator with the third optical diode and supplying a forward condition indication with the third opto-isolator, turning on a fourth opto-isolator with the fourth optical diode and supplying a reverse line condition indication with the fourth opto-isolator, supplying an off-hook signal to a fifth optical diode, turning on a fifth opto-isolator with the fifth optical diode, turning on a second transistor with the fifth optical diode and connecting a first portion of a transformer with a second diode bridge, supplying voice signals from the ring and tip lines through the second diode bridge and the first portion of the transformer to a second portion of the transformer and supplying voice signals through a first operational amplifier to a voice signal output, supplying input voice signals through a second operational amplifier to the second portion of the transformer and to the first portion of the transformer, and through the diode bridge to the tip and ring connectors and cancelling feedback of a portion of the voice signal input to an input of the first operational amplifier to cancel feedback of a portion of the voice signal input to the voice signal output.

3. A solid-state trunk interface circuit for a telephone system comprising:
   tip and ring connectors on a telephone side of the circuit;
   a diode bridge connected across the tip and ring connectors;
   a transformer and a transistor having power terminals connected in series across the diode bridge;
   an off-hook connector on a telephone equipment side of the circuit;
   a control terminal of the transistor being connected to said off-hook connector via a first opto-isolator;
   a voice signal input circuit and a voice signal output circuit connected to the transformer;
   the voice signal input circuit having a voice signal input connector and a first operational amplifier connected to the voice signal input connector and the first operational amplifier having an output connected to the transformer;
   the voice signal output circuit comprising a second operational amplifier having an input connected to the transformer and a voice signal output connector connected to an output of the second operational amplifier;

forward and reverse line condition signal connectors on the equipment side of the circuit;

first and second amplifiers having outputs respectively connected to the forward and reverse line condition signal connectors;

second and third opto-isolators respectively having outputs connected to inputs of the first and second amplifiers;

an input of the second opto-isolator being connected between the ring connector and the diode bridge to indicate a forward condition in the ring circuit;

an input of the third opto-isolator being connected between the diode bridge and the tip connector to indicate a reverse line condition;

the inputs to the second and third opto-isolators comprising diodes;

first and second zener diodes connected in parallel with the first and second input diodes in opposite direction;

the first zener diode being connected between the ring connector and the diode bridge; and the second zener diode being connected between the tip connector and the diode bridge.

4. The apparatus of claim 3 further comprising a feedback cancelling circuit connected between the voice signal input connector and the input of the second operational amplifier for cancelling feedback of a portion of the voice signal input to the voice signal output.

5. The apparatus of claim 3 further comprising a second diode bridge connected between the tip and ring connectors and a fourth opto-isolator, an input of the fourth opto-isolator connected to the second diode bridge and an output of the fourth opto-isolator connected through a third amplifier to a ring indicator connector.

6. The apparatus of claim 3 further comprising a second transistor having power terminals connected between ground and the ring connector and a fifth opto-isolator, the fifth opto-isolator having a an input connected to a control terminal of the second transistor and having an input connected to a ground start connector.

7. A trunk interface method comprising the steps of:
turning on a first light-emitting diode with an off-hook signal indication;

turning on a first opto-isolator with the first light-emitting diode;

turning on a first transistor with the first opto-isolator and forming a series connection of a first portion of a transformer to a first diode bridge with the first transistor;

supplying voice signals from tip and ring indicators to the first diode bridge and to the first portion of the transformer and supplying voice signals through the transformer to a second portion of the transformer;

amplifying the voice signals and supplying the amplified voice signals to a voice signal output;

supplying voice signals in a voice signal input;

amplifying the input voice signals and supplying the amplified input voice signals to the second portion of the transformer, through the transformer to the first portion, and through the diode bridge to the tip and ring connectors;

cancelling a portion of the voice signal input and amplifying a remaining portion of the voice signal input to the voice signal output;

sensing a first line condition with a second diode connected in series between the first diode bridge and the ring connector and turning on a second opto-isolator with the second diode;

enabling a forward condition indication with the second opto-isolator;

supplying a voice signal through a third diode connected between the diode bridge and the tip connector;

turning on a third optical isolator with the third diode and enabling a line reverse signal indication with the third opto-isolator;

supplying a signal from the tip and ring indicators to a second diode bridge;

supplying a signal to a fourth diode from the second diode bridge;

turning on a fourth opto-isolator with the fourth diode;

enabling a ring indication signal with the fourth opto-isolator;

supplying power to a fifth diode from a start input;

turning on a fifth opto-isolator with a fifth diode;

turning on a second transistor with the fifth diode; and grounding the ring connector with the second transistor.

* * * * *